(12) United States Patent
Galle et al.

(10) Patent No.: US 8,393,646 B2
(45) Date of Patent: Mar. 12, 2013

(54) PIPE CONNECTION WITH READABLE CRIMPING MARKER

(75) Inventors: Roland Galle, Schweinfurt (DE); Georg Zischke, Volkach (DE)

(73) Assignee: Uponor Innovation AB, Fristad (SE)

( * ) Notice: Subject to any disclaimer, the term of this patent is extended or adjusted under 35 U.S.C. 154(b) by 143 days.

(21) Appl. No.: 12/672,706

(22) PCT Filed: Aug. 13, 2008

(86) PCT No.: PCT/EP2008/060632
§ 371 (c)(1),
(2), (4) Date: Jan. 19, 2011

(87) PCT Pub. No.: WO2009/021972
PCT Pub. Date: Feb. 19, 2009

(65) Prior Publication Data
US 2011/0181038 A1    Jul. 28, 2011

(30) Foreign Application Priority Data
Aug. 14, 2007  (DE) .......................... 10 2007 038 273

(51) Int. Cl.
*F16L 35/00*  (2006.01)
(52) U.S. Cl. ............................................ 285/93; 73/777
(58) Field of Classification Search .................. 285/93, 285/9.1, 256; 73/777
See application file for complete search history.

(56) References Cited

U.S. PATENT DOCUMENTS

| | | | |
|---|---|---|---|
| 3,237,138 A * | 2/1966 | Kooiman et al. | 338/4 |
| 5,317,923 A * | 6/1994 | Erichsen et al. | 73/727 |
| 5,442,964 A * | 8/1995 | Coates et al. | 73/862.68 |
| 2004/0129092 A1 | 7/2004 | Dietzel | |
| 2008/0038152 A1* | 2/2008 | Van Pelt | 422/63 |

FOREIGN PATENT DOCUMENTS

| | | |
|---|---|---|
| DE | 29907585 | 9/1999 |
| DE | 19856769 | 5/2000 |
| DE | 20103434 | 9/2001 |
| EP | 0185650 | 6/1986 |
| EP | 1772659 | 4/2007 |
| EP | 1790896 | 5/2007 |
| WO | 2004/096499 | 11/2004 |

OTHER PUBLICATIONS

Clarke, P. "Philips baut Permanentspeicher aus Plastik" http://www.eetimes.de/semi/news/showArticle.jhtml?articleID=60405018 (Mar. 3, 2005), Date of access: Jan. 10, 2006 (English Summary).
"Brokering von Druckmesszellen" *Analog Microelectronics*. http://www.analogmicro.de/german/dice/broker.htm Date of access: Jan. 11, 2006 (English Summary).

(Continued)

*Primary Examiner* — Aaron Dunwoody
(74) *Attorney, Agent, or Firm* — Occhiuti Rohlicek & Tsao LLP

(57) ABSTRACT

In an aspect, in general, a pipe connection with readable compression marker is provided with a fitting to which a pipe end can be connected, a pipe with an end connectable to fitting and a pressing area in which a pressing force can be applied onto fitting and/or pipe end to connect pipe end to fitting. The pressing area has a compression marker material and/or element, whose magnetic and/or electrical properties change when pressing area is subjected to the pressing force. A magnetic and/or electrical property of compression marker material and/or element is detectable in a non-contacting manner.

3 Claims, 1 Drawing Sheet

OTHER PUBLICATIONS

"Chip-Fingerabdrucksysteme sollen Mobiltelefone schützen" http://www.golem.de/0208/21168.html, (Aug. 13, 2002) Date of Access: Jan. 11, 2006 (English Summary).

"Philips entwickelt Plastik-Speicher für RFIDs" http://www.golem.de/0502/36535.html (Feb. 25, 2005) Date of Access: Jan. 11, 2006 (English Summary).

* cited by examiner

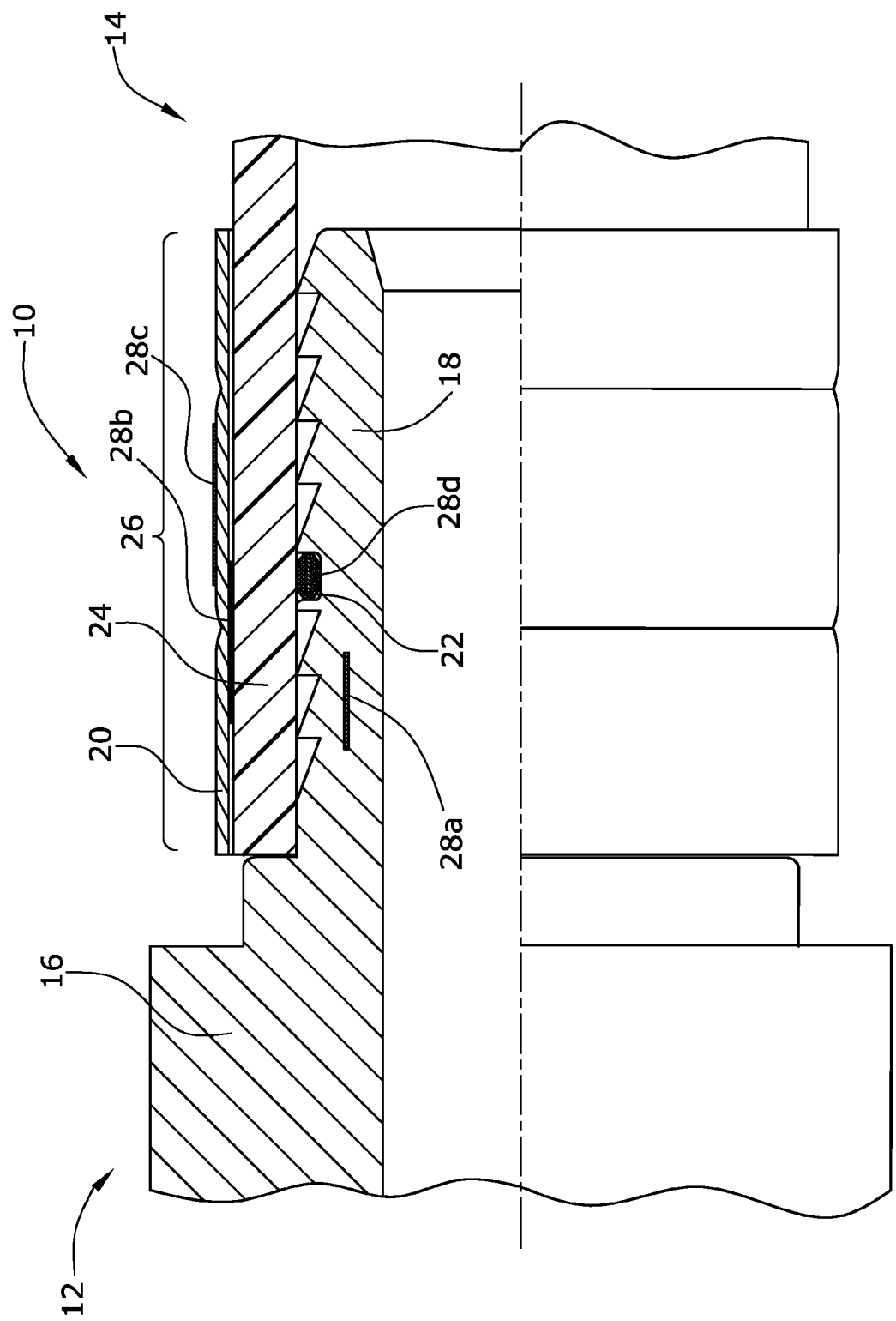

PIPE CONNECTION WITH READABLE CRIMPING MARKER

CROSS-REFERENCE TO RELATED APPLICATIONS

This application is the National Stage of International Application No. PCT/EP2008/060632, filed on Aug. 13, 2008, which claims the priority of German Patent Application No. 10 2007 038 273.3, filed on Aug. 14, 2007. The contents of both applications are hereby incorporated by reference in their entirety.

FIELD OF DISCLOSURE

The invention relates to a pipe connection with a fitting to which a pipe end can be connected and a pipe connectable to the fitting, wherein it is readable from the outside whether the pipe connection has been compressed in conformance with specifications.

BACKGROUND

The use of fittings for producing pipe connections is known. In this regard, the end of a pipe to be connected is fixed to the fitting. The fitting can be a pipe coupler, an angular elbow, a curved elbow, a T-connector, a wall plate or similar elements. The fitting itself can be constructed as a press fitting or a sliding sleeve or as a fitting with a sleeve made of a shape-memory alloy material. Finally, the use of threaded fittings for pipe connections is known.

All the aforementioned pipe connections have in common the fact that a pressing force is exerted inside a pressing area onto the fitting and/or the pipe to connect the pipe end to the fitting. For compression fittings, this is accomplished by radial compression of a pressing sleeve and/or a metal insert of the pipe with the aid of a pressing tool. For threaded fittings, the pressing force is realized, for example, by screwing a union nut onto a slit clamping ring that presses against the pipe from the outside. For fittings with sliding sleeves, the pressing force is created by axially pushing a non-expandable sleeve onto the widened end of the pipe that is situated on the fitting.

It is desirable for the compression state of the pipe connection to be detectable from the outside. Compression fittings with a compression marker exist in prior art, as described, for example, in WO 2004/096499 A1, DE 299 07 585 U1 and EP 1 790 896 A1. It is disadvantageous that the readout is done "by inspection." In areas that can only be inspected visually to a limited extent, the known compression marker systems are less suitable.

From DE 198 56 769 C1, a compression pipe fitting is known that uses a contact pin as a position control element. The contact pin is arranged in such a manner that it extends radially through the wall of the compression fitting element. As soon as the conduit is at the level of the contact pin due to axial insertion, the contact pin moves radially outwards. This indicates that the conduit has been inserted sufficiently far into the compression fitting. The compression state of the compression fitting cannot be indicated by the contact pin, however.

SUMMARY

The object of the invention is to propose a pipe connection with a compression marker in which the reading of the compression marker is improved.

To solve this problem, the invention proposes a pipe connector with a readable compression marker, wherein the pipe connector is provided with:
a fitting to which a pipe end can be connected,
a pipe with an end connectable to the fitting and
a pressing area in which a pressing force can be exerted onto the fitting and/or the pipe end to connect the pipe end to the fitting.

It is provided according to the invention for this pipe connection:
that the pressing area has a compression marker material and/or element, whose magnetic and/or electrical properties change when the pressing area is subjected to the pressing force, and
that a magnetic and/or electrical property of the compression marker material and/or element is detectable in a non-contact manner.

The pipe connection according to the invention comprises a fitting and a pipe connectable thereto. The fitting here can be configured in any desired manner, as known from a wide variety of different fitting designs. The pipe can be a plastic pipe, a plastic-metal composite pipe or a metal pipe.

According to the invention, the fitting and the pipe are connected by applying a pressing force inside a contact area between the fitting and the pipe.

According to the invention, the pressing area, i.e., either the fitting or the pipe end or both has a compression marker material and/or element whose magnetic and/or electrical properties change when the pressing area is subjected to the (specified) pressing force. The changed properties are, thus, "stored" in the material or element in a manner of speaking, and can subsequently be read out or detected without contact. For this purpose, the pipe connection is exposed to a magnetic or electrical force generated by a reading device or the like.

The advantage of the compression marker querying according to the invention is that a visual inspection of the pipe connection is no longer required. Thus, for example, the pipe connection can be installed in an enclosed space without impairment of the detectability of the compression marker.

Another advantage for suppliers of pipe connection systems is that they are better protected from product piracy. The compression marker of the invention likewise protects the system supplier against complaints for compensation due to allegedly inadequate products. Crimping of pipes with fittings not conforming to specifications can now be easily detected by the system supplier.

In an advantageous embodiment of the invention, it can be provided that it is possible to read out whether the pipe connection has been subjected to the specified pressing force, which must be within a permissible range, based on the magnetic and/or electrical properties of the compression marker material or element that are detectable by non-contacting means. Thus, a quantitative determination can be made for the pipe connection according to the invention, in addition to a qualitative one.

A pressure sensor inside the compression marker or element is not necessarily required to be detectable in a non-contacting manner from the outside, whether the pressing area has been subjected to the pressing force. On the other hand, it is not out of the question for the material or element to have a pressure measuring cell or similar pressure sensor. The only thing that is crucial is the change of the magnetic and/or electrical properties of the material or element. Thus, it is possible for an elongation measuring strip, which changes its electrical properties, for example, when deformed, to be used as the material or element. Such electrically conductive materials are conventionally known. For example, electrical contacts, by means of which the material or element can be subjected to an electrical potential applied for the non-contact readout, are provided on the pipe end. Even such a system is considered "operating without contact" in the sense of the invention.

Memories based on plastic, RFID components and transponders or piezoelectric (e.g., piezoresistive) materials are considered particularly suitable.

The compression marker material or element can be positioned at various places inside the pressing area of the pipe connection.

If, for example, the fitting comprises a sleeve (e.g., also in the form of a clamping ring) to be pressed externally against the pipe from the outside, then the compression marker material or element can be arranged inside this sleeve. Alternatively, it can be arranged in a support sleeve of the fitting onto which the pipe end to be connected is pushed. Finally, it is also conceivable that the pipe end itself be provided with the compression marker material or element. The newer generation of polymer memories, for example, are suitable to be "cast" onto other elements. It is also conceivable that the compression marker material and/or element be arranged inside an adhesive strip or thereon, the adhesive strip then being laid around the pipe to be connected or the compression sleeve (in the case of a press or compression fitting).

In another advantageous implementation of the invention, it is provided that quantitative information on the applied pressing force, such as its magnitude, can be stored in the compression marker material and/or element. Further information that can be stored can be the manufacturing time, the production batch, the time of compression and information on the materials used for the pipe connection.

BRIEF DESCRIPTION OF THE DRAWINGS

FIG. 1 is a pipe connection including a readable crimping marker.

DETAILED DESCRIPTION

The invention, which is illustrated in the drawing, will be described in detail below with reference to an exemplary embodiment.

The drawing shows half of a cross section through a pipe connection 10 having a fitting 12 and a pipe 14 connected thereto. Fitting 12 consists, for example, of plastic, a metal alloy or a plastic-metal composite material and has a fitting body 16 from which a supporting sleeve 18 projects. Fitting 12 further comprises a radially compressible pressing sleeve 20 made in this example of metal (for example, aluminum alloy or steel).

The end 24 of a pipe 14 to be connected is pushed onto support sleeve 18, which can be furnished with a sealing ring 22 on its exterior. Pressing sleeve 20 is situated concentrically around this end 24. Pressing sleeve 20, pipe end 24, support sleeve 18 and, if present, sealing ring 22 are situated inside a pressing area 26, inside of which a pressing force of a specified magnitude (minimum and maximum magnitude) is applied to produce pipe connection 10.

Inside of pressing area 26 in the exemplary embodiment of the invention described here, there is a compression marker material and/or element 28a, 28b, 28c or 28d situated either in support sleeve 18 (see 28a), inside or on the wall of pipe end 24 (see 28b), inside or on the wall of pressing sleeve 20 (see 28c) and/or inside the material of the sealing element (see 28d). If the material or element for reproducing the compression marker state is mounted on pipe end 24 or pressing sleeve 20, it is provided that, for example, an adhesive strip be used that carries or comprises the material or element 28b or 28c.

The compression marker element or material 28a, 28b, 28c or 28d has magnetic and/or electrical properties that change when subjected to a pressing force. This change can then be read without contact after pipe connection 10 has been compressed, whereby a 100% specification-conforming compression marker is provided.

What is claimed is:

1. Pipe connection with a readable compression marker, comprising:
    a fitting to which a pipe end can be connected,
    a pipe with an end connectable to the fitting, and
    a pressing area in which a pressing force can be exerted onto one or both of the fitting and the pipe end to connect the pipe end to the fitting,
wherein
    the pressing area comprises the readable compression marker which includes one or both of a compression marker material and a compression marker element, the readable compression marker having one or both of magnetic and electrical properties which change when the pressing area is subjected to the pressing force,
    the one or both of the magnetic and the electrical property of the readable compression marker is detectable in a non-contacting manner, and
    quantitative information on the applied pressing force, such as its magnitude, can be stored in the readable compression marker.

2. Pipe connection according to claim 1, wherein the readable compression marker is arranged on or in the fitting or the pipe end.

3. Pipe connection according to claim 2, wherein the readable compression marker is arranged in or on at least one of a fitting body, a support sleeve, a sealing element and a pressing sleeve of the fitting.

* * * * *